United States Patent [19]

Shigemura

[11] Patent Number: 5,753,140

[45] Date of Patent: May 19, 1998

[54] POLARIZING SHEET AND LIQUID CRYSTAL DISPLAY

[75] Inventor: Takashi Shigemura, Kanagawa, Japan

[73] Assignee: Fuji Photo Film Co., Ltd., Kanagawa, Japan

[21] Appl. No.: 724,397

[22] Filed: Oct. 2, 1996

[30] Foreign Application Priority Data

Oct. 2, 1995 [JP] Japan .................................. 7-279658

[51] Int. Cl.⁶ .............................. C09K 19/52; G02F 1/13
[52] U.S. Cl. .................................. 252/299.01; 252/299.5; 349/96; 428/1
[58] Field of Search ......................... 252/299.01, 299.5; 428/1; 349/96

[56] References Cited

U.S. PATENT DOCUMENTS 3,970,362   7/1976   Laliberte .................................. 350/155

*Primary Examiner*—Shean C. Wu
*Attorney, Agent, or Firm*—Birch, Stewart, Kolasch & Birch, LLP

[57] ABSTRACT

A polarizing sheet comprises a polarizing film interposed between a pair of protective films. The protective film comprises a cellulose ester of a lower fatty acid. The protective film has such heat moisture resistance that shrinkage ratio of the film in area is less than 10% after the film is left at 85° C. and 90% RH for 500 hours. Further, the protective film has an equilibrium moisture content of less than 2.5 wt. % at 25° C. and 65% RH. A liquid crystal display having the polarizing sheet is also disclosed.

20 Claims, No Drawings

POLARIZING SHEET AND LIQUID CRYSTAL DISPLAY

FIELD OF THE INVENTION

The present invention relates to a polarizing sheet comprising a polarizing film and a protective film. The invention also relates to a liquid crystal display having the polarizing sheet.

BACKGROUND OF THE INVENTION

A liquid crystal display usually comprises a liquid crystal cell and a polarizing sheet. The polarizing sheet comprises a polarizing film interposed between a pair of protective films. The polarizing film usually is a resin film containing iodine or a dichromatic dye as a polarizing material. The protective film requires low birefringence and high transparency.

A cellulose ester of a lower fatty acid, particularly cellulose acetate is a transparent resin of low birefringence. Accordingly, a protective film of a polarizing sheet usually is made of a cellulose ester of a lower fatty acid. Most of commercially available liquid crystal displays use a cellulose acetate film as the protective film of the polarizing sheet. The cellulose acetate film usually contains a phosphoric ester plasticizer (e.g., triphenyl phosphate), which has a function of improving conversion characteristics of the film. The phosphoric ester plasticizer is usually used in an amount of 5 to 30 wt. % based on the amount of cellulose acetate.

A liquid crystal display, particularly a display of a mobile personal computer or a display in a car may be used under severe conditions of high temperature and high humidity. It has been known that a cellulose ester film does not have sufficient endurance, particularly heat moisture resistance under severe conditions, though the cellulose ester film has excellent optical characteristics.

Japanese Patent Provisional Publication Nos. 61(1986)-243407 and 1(1989)-214802 propose means of improving heat moisture resistance of a protective film made of a cellulose ester of a lower fatty acid.

Japanese Patent Provisional Publication No. 61(1986)-243407 discloses a polarizing sheet comprising a polarizing film and a overcoating layer (protective film) provided on at least one side of the polarizing film, wherein the overcoating layer is a cellulose film containing a plasticizer of not more than 10 wt. %. The publication describes that the problems of (a) shrinkage and cracks caused in a film, (b) insufficiency or aging of adhesion between films, (c) decrease of polarizing character or color change of a film, (d) degradation of outer surface and (e) inefficiency or difficulty in a process of adhering films are solved by reducing an amount of a plasticizer in a cellulose film or by incorporating no plasticizer into a cellulose film. The problems (a) to (d) relate to endurance, particularly heat moisture resistance of a cellulose film. The publication further describes that examples of the plasticizers (used in a restricted amount) include a phosphoric ester plasticizer (e.g., triphenyl phosphate, tricresyl phosphate) and a phthalic ester plasticizer (e.g., diethyl phthalate, dimethyl phthalate).

In Examples 1 & 2 of Japanese Patent Provisional Publication No. 61(1986)-243407, a cellulose film is prepared by extracting a plasticizer from a commercially available cellulose triacetate film (Fuji Tack Clear, Fuji Photo Film Co., Ltd.). In more detail, the commercially available film is immersed in methanol to reduce the amount of the plasticizer to 9.2 wt. % (Example 1) or 8.1 wt. % (Example 2). The publication reports that the films obtained in Examples 1 & 2 have such heat moisture resistance that dimensional change of the film is 1.2% (Example 1) or 0.8% (Example 2) after the film is left at 80° C. and 90% RH for 500 hours.

Japanese Patent Provisional Publication No. 1(1989)-214802 discloses a polarizing sheet improved in heat moisture resistance comprising a polarizing element film (polarizing film) and a supporting film (protective film), wherein the supporting film is a cellulose triacetate (TAC) film containing no plasticizer. The publication describes that the TAC film containing no plasticizer has such endurance that no color change in the film is observed after the film is left at 80° C. and 90% RH for 100 hours.

The publication further describes that examples of the plasticizers (forbidden to use) include triphenyl phosphate and diethyl phthalate. The publication does not present experimental data.

As is described above, Japanese Patent Provisional Publication Nos. 61(1986)-243407 and 1(1989)-214802 describe that aging of a cellulose ester film is caused by a plasticizer (a phosphoric ester plasticizer or a phthalic ester plasticizer). Therefore, the publications propose that the amount of the plasticizer in a cellulose ester film should be reduced, or no plasticizer is used in the film.

SUMMARY OF THE INVENTION

The applicant has studied cellulose ester films containing a small amount of a plasticizer or no plasticizer disclosed in Japanese Patent Provisional Publication Nos. 61(1986)-243407 and 1(1989)-214802. The applicant has confirmed that thermal moisture resistance of a cellulose ester film is improved by reducing an amount of a plasticizer.

However, a cellulose ester film containing a small amount of a plasticizer or no plasticizer has another problem. The plasticizer is used to improve conversion characteristics of a film. If an amount of a plasticizer is insufficient, a problem is naturally caused in conversion of a film. A film containing an insufficient amount of a plasticizer has a high moisture content, and lacks flexibility. If an inflexible film used as a protective film of a polarizing sheet, crack or separation is caused around the sheet while punching it according to a shape of a liquid crystal display. Further, a film having a high moisture content is inferior in dimensional stability because dimensions of the film might greatly change according to humidity in an atmosphere.

Japanese Patent Provisional Publication Nos. 61(1986)-243407 and 1(1989)-214802 describe merits of improving the endurance of a film, but do not describe demerits caused by an insufficient amount of a plasticizer. The applicant has further studied films disclosed in the publications.

In all Examples of Japanese Patent Provisional Publication No. 61(1986)-243407, a phosphoric ester (triphenyl phosphate or tricresyl phosphate) is used as a plasticizer. All commercially available cellulose acetate films (including Fuji Tack Clear of Fuji Photo Film Co., Ltd.) contain a phosphoric ester as a plasticizer. Japanese Patent Provisional Publication No. 1(1989)-214802 does not present experimental data.

The applicant has furthermore studied plasticizers, and surprisingly found that aging of a cellulose ester film is caused by a phosphoric ester plasticizer, but is not caused by a phthalic ester plasticizer.

An object of the invention is to provide a polarizing sheet improved in heat moisture resistance and in conversion characteristics.

The present invention provides a polarizing sheet comprises a polarizing film interposed between a pair of protective films, said protective film comprising a cellulose ester of a lower fatty acid, wherein the protective film has such heat moisture resistance that shrinkage ratio of the film in area is less than 10% after the film is left at 85° C. and 90% RH for 500 hours, and the protective film has an equilibrium moisture content of less than 2.5 wt. % at 25° C. and 65% RH.

The invention also provides a liquid crystal display which comprises a liquid crystal cell and a polarizing sheet, said cell comprising a liquid crystal, a substrates and a transparent electrode, said polarizing sheet comprising a polarizing film interposed between a pair of protective films, and said protective film comprising a cellulose ester of a lower fatty acid, wherein the protective film has such heat moisture resistance that shrinkage ratio of the film in area is less than 10% after the film is left at 85° C. and 90% RH for 500 hours, and the protective film has an equilibrium moisture content of less than 2.5 wt. % at 25° C. and 65% RH.

DETAILED DESCRIPTION OF THE INVENTION

The protective film used in the invention has such heat moisture resistance that shrinkage ratio of the film in area is less than 10% after the film is left at 85° C. and 90% RH for 500 hours. The shrinkage ratio is preferably less than 8%, more preferably less than 7%, and most preferably less than 6%. The shrinkage ratio of a protective film is determined by cutting the film into pieces of a rectangular shape of 60×70mm², sticking two pieces with an acrylic resin adhesive, placing the pieces in a thermostate at 85° C. and 90% RH for 500 hours, and measuring sizes of the pieces.

The protective film of the invention has an equilibrium moisture content of less than 2.5 wt. % at 25° C. and 65% RH. The equilibrium moisture content is preferably less than 2.2 wt. %, more preferably less than 2.0 wt. %. The equilibrium moisture content of a protective is determined by cutting the film into pieces of a rectangular shape of 60×70 mm², placing a piece in a thermostate at 25° C. and 65% RH for 3 hours, and measuring weight of the conditioned film piece. Further, the film piece is completely dried, and then the weight of the piece is measured. The equilibrium moisture content is the ratio of the water content in the conditioned film (difference between the dry film and the conditioned film in weight) based on the weight of the conditioned film.

The protective film of the invention comprises a cellulose ester of a lower fatty acid. The lower fatty acid has 1 to 6 carbon atoms. The number of the carbon atom preferably is 2 (cellulose acetate), 3 (cellulose propionate) or 4 (cellulose butyrate). Cellulose acetate is further preferred. Cellulose triacetate (acetic acid content: 59% to 62%) is particularly preferred. An ester of two or more lower fatty acids, such as cellulose acetate propionate or cellulose acetate butyrate can also be used as a cellulose ester.

The protective film preferably substantially does not contain a phosphoric ester plasticizer to obtain the heat moisture resistance, as is defined above. The term "substantially does not contain" means that the amount of the phosphoric ester plasticizer is less than 2.0 wt. % based on the amount of the cellulose ester of the lower fatty acid. The amount of the phosphoric ester plasticizer preferably is less than 1.5 wt. %, more preferably is less than 1.0 wt. %, and most preferably is 0 wt. % (not detected amount).

The protective film preferably contains a phthalic ester plasticizer in an amount of 8 to 25 wt. % based on the amount of the cellulose ester of the lower fatty acid to obtain the low equilibrium moisture content, as is defined above. The amount of the phthalic ester plasticizer is preferably in the range of 10 to 20 wt. %, more preferably in the range of 13 to 19 wt. %, and most preferably in the range of 15 to 18 wt. %.

A lower alkyl ester of a phthalic acid is preferably used as the phthalic ester plasticizer. The lower alkyl has 1 to 6 carbon atoms. The number of the carbon atom preferably is 1 to 4, more preferably is 1 to 3, and most preferably is 1 or 2. The alkyl group may have a substituent group such as an alkoxy group (e.g., methoxy, ethoxy). An alkyl group having no substituent group is preferred to a substituted alkyl group. Dimethyl phthalate and diethyl phthalate are preferred phthalic ester plasticizers. Diethyl phthalate is particularly preferred.

A cellulose ester film can be formed by a melt casting method or a solvent casting method. The melt casting method comprises heating a cellulose ester and a phthalic ester plasticizer to form a melt, casting the melt on a support and cooling the melt to form a film. The solvent casting method comprises dissolving a cellulose ester and a phthalic ester plasticizer in a solvent to form a solution (dope), casting the dope on a support and drying the dope to form a film. The solvent casting method is superior to the melt casting method in flatness of film.

The solvent casting method can be classified into a band casting method using a band as the support and a drum casting method using a drum as the support. The band casing method is described in Japanese Patent Publication Nos. 39(1964)-29211, 62(1987)-43848 and Japanese Patent Provisional Publication No. 61(1986)-100421. The drum casting method is described in Japanese Patent Provisional Publication Nos. 62(1987)-64514 and 62(1987)-115035. The concentration of the dope is usually in the range of 10 to 85 wt. %, and preferably in the range of 15 to 80 wt. %.

The protective films of the invention are provided on both sides of a polarizing film to form a polarizing sheet. The protective film has a thickness preferably in the range of 25 to 300 μm, and more preferably in the range of 50 to 200 μm. An ultraviolet absorbing agent, a slip agent or a deterioration inhibitor can be incorporated into the protective film.

The polarizing films of the polarizing sheet include an iodine polarizing film, a dye such as a dichromatic dye polarizing film and a polyene polarizing film. The polarizing film is usually made of a polyvinyl alcohol film.

A surface treated membrane can be provided on the protective film. The surface treated membrane can function as a hard coat layer, an anti-fogging layer, an anti-irradiation layer or an anti-reflection layer.

A liquid crystal display can be prepared by sticking the polarizing sheet on a liquid crystal cell. The liquid crystal cell is usually prepared by incorporating a liquid crystal into a space formed by a pair of substrates and spacers arranged between the substrates. A transparent electrode is made of transparent electroconductive compounds, and is formed on the substrates.

The liquid crystal cell may further have a gas barrier layer, a hard coat layer or an undercoating layer (used as an adhesive layer of a transparent electrode). These optional layers are usually provided on the substrates.

The substrate of the liquid crystal cell has a thickness usually in the range of 80 to 500 μm. A deterioration inhibitor or a plasticizer can be incorporated into the substrate.

A liquid crystal display may further have a phase retarder. The phase retarder is a birefringent film having a function of removing color from the display.

A lamination of two films of positive birefringence and negative birefringence can be used as a phase retarder to enlarge the field of the display. Further, a resin film having a liquid crystal layer arranged thereon can also be used as a phase retarder (described in Japanese Patent Provisional Publication Nos. 3(1991)-9325 and 6(1995)-148429). Orientation on the phase retarder can be directed in a perpendicular direction by an outer force.

The thickness of the phase retarder is usually in the range of 30 to 250 μm. Two or more phase retarder sheets can be used in combination to obtain a high retardation value.

An adhesive is used to stick the polarizing sheet, the liquid crystal cell and the phase retarder. Accordingly, an adhesive layer is provided between the polarizing sheet, the liquid crystal cell and the phase retarder. Various known adhesives can be used in the liquid crystal display.

Examples of the elastic adhesives include a polyvinyl alcohol resin, an SBR resin, an acrylic resin and a silicone resin. The acrylic resin is particularly preferred, because the acrylic resin is excellent in heat resistance.

The adhesive layer preferably has a thickness in the range of 1 to 50 μm. If an elastic adhesive (e.g., an acrylic resin) is used in the adhesive layer, the adhesive layer preferably has a thickness in the range of 10 to 40 μm. If the adhesive is not elastic, the adhesive layer preferably has a thickness in the range of 1 to 10 μm.

EXAMPLE 1

In 62 weight parts of methylene chloride, 12 weight parts of methanol and 2 weight parts of butanol were mixed to obtain a solvent mixture. In the solvent mixture, 20.5 weight parts of cellulose triacetate and 3.5 weight parts (17 wt. % of cellulose triacetate) of diethyl phthalate were dissolved to prepare a dope. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The obtained film was cut into pieces of a rectangular shape of 60×70 mm². Two pieces were stuck with an acrylic resin adhesive to prepare a sample. The sample was placed in a thermostate at 85° C. and 90% RH for 500 hours.

The sample was observed, and evaluated about change of color and occurrence of cracks according to the following three grades.

A: No color change and no crack was observed.

B: Color change was observed, but no crack was observed.

C: Color change and cracks were observed.

The size of the sample was measured to determine the shrinkage ratio of the film (%).

Further, the film was cut into pieces of a rectangular shape of 60×70 mm² to prepare a sample. The sample was placed in a thermostate at 25° C. and 65% RH for 3 hours. The weight of the conditioned sample was measured. Another sample was completely dried. The weight of the dried sample was measured. The equilibrium moisture content was calculated from the weight of the conditioned sample and the weight of the dried sample.

Furthermore, two films were stuck on both sides of a polarizing film by using an acrylic resin adhesive to prepare a polarizing sheet. The polarizing sheet was punched according to the shape of a liquid crystal display. The side of the punched sheet was observed, and evaluated about occurrence of crack or separation. In the case that crack or separation was observed, the ratio of occurrence of crack or separation around the sheet (%) was measured. The result was classified according to the following three grades.

A: No crack and no separation was observed.

B: Cracks and separation were observed on less than 50% of the side of the sheet.

C: Cracks and separation were observed on not less than 50% of the side of the sheet.

A liquid crystal display was prepared by using the polarizing sheet.

EXAMPLE 2

In 62 weight parts of methylene chloride, 12 weight parts of methanol and 2 weight parts of butanol were mixed to obtain a solvent mixture. In the solvent mixture, 19.5 weight parts of cellulose triacetate and 4.5 weight parts (23 wt. % of cellulose triacetate) of diethyl phthalate were dissolved to prepare a dope. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The film was evaluated in the same manner as in Example 1.

COMPARISON EXAMPLE 1

In 62 weight parts of methylene chloride, 12 weight parts of methanol and 2 weight parts of butanol were mixed to obtain a solvent mixture. In the solvent mixture, 22.4 weight parts of cellulose triacetate and 1.6 weight parts (7 wt. % of cellulose triacetate) of diethyl phthalate were dissolved to prepare a dope. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The film was evaluated in the same manner as in Example 1.

COMPARISON EXAMPLE 2

In 62 weight parts of methylene chloride, 12 weight parts of methanol and 2 weight parts of butanol were mixed to obtain a solvent mixture. In the solvent mixture, 21 weight parts of cellulose triacetate, 2 weight parts of triphenyl phosphate and 1 weight part of biphenyldiphenyl phosphate were dissolved to prepare a dope. The total amount of the phosphate plasticizers was 14 wt. % of cellulose triacetate. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The film was evaluated in the same manner as in Example 1.

COMPARISON EXAMPLE 3

In 62 weight parts of methylene chloride, 12 weight parts of methanol and 2 weight parts of butanol were mixed to obtain a solvent mixture. In the solvent mixture, 22.5 weight parts of cellulose triacetate, 1 weight part of triphenyl phosphate and 0.5 weight part of biphenyldiphenyl phosphate were dissolved to prepare a dope. The total amount of the phosphate plasticizers was 7 wt. % of cellulose triacetate. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The film was evaluated in the same manner as in Example 1.

COMPARISON EXAMPLE 4

In 62 weight parts of methylene chloride, 12 weight parts of methanol and 2 weight parts of butanol were mixed to obtain a solvent mixture. In the solvent mixture, 23.5 weight parts of cellulose triacetate was dissolved to prepare a dope. The dope was cast on a support to form a film. The formed film was peeled from the support. The volatile content (remaining amount of the solvent) in the peeled film was 70 wt. %. The film was dried while tentering the film. The volatile content in the dried film was 0.5 wt. %. The dried film was wound on a roll to prepare a cellulose triacetate film. The thickness of the film was 80 μm.

The film was evaluated in the same manner as in Example 1.

The results are set forth in Table 1.

TABLE 1

| Film | Plasticizer Phtha. | Plasticizer Phos. | Resistance Color | Resistance Shrink | Bleed | Punching | Moisture |
|---|---|---|---|---|---|---|---|
| Ex.1 | 17% | 0% | A | 4% | − | A | 1.8% |
| Ex.2 | 23% | 0% | A | 7% | + | A | 1.5% |
| Comp.1 | 7% | 0% | A | 2% | − | C | 2.8% |
| Comp.2 | 0% | 14% | C | 19% | − | B | 2.1% |
| Comp.3 | 0% | 7% | B | 13% | − | C | 2.3% |
| Comp.4 | 0% | 0% | A | 2% | − | C | 3.3% |

(Remark)
Phtha.: The amount of a phthalic ester plasticizer based on the amount of cellulose triacetate
Phos.: The (total) amount of a phosphoric ester plasticizer based on the amount of cellulose triacetate
Color: Change of color and occurrence of cracks in the film
Shrink: Shrinkage ratio of the film
Bleed: Bleeding of a plasticizer observed (+) or not (−)
Punching: Crack or separation in the punched sample
Moisture: Equilibrium moisture content As is described above, the polarizing sheet of the present invention is improved in heat moisture resistance and in conversion characteristics by using a phthalic ester plasticizer in place of a phosphoric ester plasticizer.

I claim:

1. A polarizing sheet which comprises a polarizing film interposed between a pair of protective films, said protective film comprising a cellulose ester of a lower fatty acid, wherein the protective film has heat moisture resistance that shrinkage ratio of the film in area is less than 10% after the film is left at 85° C. and 90% RH for 500 hours, and the protective film has an equilibrium moisture content of less than 2.5 wt. % at 25° C. and 65% RH, wherein the protective film substantially does not contain a phosphoric ester plasticizer, and the protective film contains a phthalic ester plasticizer in an amount of 13 to 19 wt. % based on the amount of the cellulose ester of the lower fatty acid.

2. The polarizing sheet as claimed in claim 1, wherein the phthalic ester plasticizer is a lower alkyl ester of phthalic acid.

3. The polarizing sheet as claimed in claim 2, wherein the phthalic ester plasticizer is dimethyl phthalate or diethyl phthalate.

4. The polarizing sheet as claimed in claim 1, wherein the cellulose ester of the lower fatty acid is cellulose acetate.

5. The polarizing sheet as claimed in claim 1, wherein the protective film has a thickness in the range of 25 to 350 μm.

6. The liquid crystal display as claimed in claim 5, wherein the cellulose ester of the lower fatty acid is cellulose acetate.

7. A liquid crystal display which comprises a liquid crystal cell and a polarizing sheet, said cell comprising a liquid crystal, a substrate and a transparent electrode, said polarizing sheet comprising a polarizing film interposed between a pair of protective films, and said protective film comprising a cellulose ester of a lower fatty acid, wherein the protective film has heat moisture resistance that shrinkage ratio of the film in area is less than 10% after the film is left at 85° C. and 90% RH for 500 hours, and the protective film has an equilibrium moisture content of less than 2.5 wt. % at 25° C. and 65% RH, wherein the protective film substantially does not contain a phosphoric ester plasticizer, and the protective film contains a phthalic ester plasticizer in an amount of 13 to 19 wt. % based on the amount of the cellulose ester of the lower fatty acid.

8. The polarizing sheet as claimed in claim 1, wherein the shrinkage ratio of the protective film in area is less than 6% after the film is left at 85° C. and 90% RH for 500 hours.

9. The liquid crystal display of claim 7, wherein the shrinkage ratio of the protective film in area is less than 6% after the film is left at 85° C. and 90% RH for 500 hours.

10. The polarizing sheet as claimed in claim 1, wherein the protective film has an equilibrium moisture content of less than 2.0 wt. % at 25° C. and 65% RH.

11. The liquid crystal display of claim 7, wherein the protective film has an equilibrium moisture content of less than 2.0 wt. % at 25° C. and 65% RH.

12. The polarizing sheet of claim 1, wherein the cellulose ester of the lower fatty acid is cellulose propionate, cellulose butyrate, or cellulose triocetate.

13. The liquid crystal display of claim 7, wherein the cellulose ester of the lower fatty acid is cellulose propionate, cellulose butyrate, or cellulose triocetate.

14. The polarizing sheet of claim 1, wherein the protective film contains less than 1.5 wt. % phosphoric ester plasticizer.

15. The liquid crystal display of claim 7, wherein the protective film contains less than 1.5 wt. % phosphoric ester plasticizer.

16. The polarizing sheet as claimed in claim 1, wherein the protective film contains a phthalic ester plasticizer in an amount of 15 to 18 wt. % based on the amount of the cellulose ester of the lower fatty acid.

17. The liquid crystal display of claim 7, wherein the protective film contains a phthalic ester plasticizer in an amount of 15 to 18 wt. % based on the amount of the cellulose ester of the lower fatty acid.

18. The liquid crystal display of claim 7, wherein the protective film has a thickness of 25 to 300 μm.

19. The liquid crystal display of claim 7, wherein the phthalic ester plasticizer is a lower alkyl ester of phthalic acid.

20. The liquid crystal display of claim 7, wherein the phthalic ester plasticizer is dimethyl phthalate or diethyl phthalate.

* * * * *